United States Patent [19]

Lewis

[11] Patent Number: 5,734,819
[45] Date of Patent: Mar. 31, 1998

[54] METHOD AND APPARATUS FOR VALIDATING SYSTEM OPERATION

[75] Inventor: David Otto Lewis, Rochester, Minn.

[73] Assignee: International Business Machines Corporation, Armonk, N.Y.

[21] Appl. No.: 322,246

[22] Filed: Oct. 12, 1994

[51] Int. Cl.⁶ .................................................. G06F 11/00
[52] U.S. Cl. ......................... 395/186; 380/45; 364/260.81; 364/286.4
[58] Field of Search ........................ 395/186, 187.01, 395/188.01; 380/4, 25, 30, 45; 364/222.5, 260.81, 286.4, 286.5

[56] References Cited

U.S. PATENT DOCUMENTS

| | | | |
|---|---|---|---|
| 4,264,782 | 4/1981 | Konheim | 395/186 X |
| 4,424,573 | 1/1984 | Eckert, Jr. et al. | 364/900 |
| 4,442,486 | 4/1984 | Mayer | 364/200 |
| 4,454,594 | 6/1984 | Heffron et al. | 364/900 |
| 4,462,076 | 7/1984 | Smith, III | 364/200 |
| 4,634,807 | 1/1987 | Chorley | 178/22.08 |
| 4,652,990 | 3/1987 | Pailen et al. | 364/200 |
| 4,670,857 | 6/1987 | Rackman | 380/4 |
| 4,688,169 | 8/1987 | Joshi | 364/200 |
| 4,731,748 | 3/1988 | Haneda | 364/900 |
| 4,751,667 | 6/1988 | Ross | 364/900 |
| 4,866,769 | 9/1989 | Karp | 380/4 |
| 4,903,299 | 2/1990 | Lee et al. | 380/25 |
| 4,933,969 | 6/1990 | Marshall | 380/125 |
| 5,068,894 | 11/1991 | Hoppe | 380/23 |
| 5,075,805 | 12/1991 | Peddle et al. | 360/61 |
| 5,113,518 | 5/1992 | Durst, Jr. et al. | 395/550 |
| 5,182,770 | 1/1993 | Medveczky | 380/4 |
| 5,199,066 | 3/1993 | Logan | 380/4 |
| 5,276,738 | 1/1994 | Hirsch | 380/46 |
| 5,282,247 | 1/1994 | McLean et al. | 380/4 |
| 5,287,408 | 2/1994 | Samson | 380/4 |
| 5,337,357 | 8/1994 | Chou | 380/4 |
| 5,343,524 | 8/1994 | Mu et al. | 380/4 |
| 5,379,433 | 1/1995 | Yamagishi | 395/186 |
| 5,386,468 | 1/1995 | Akiyama | 380/25 |
| 5,388,212 | 2/1995 | Grube | 395/186 |
| 5,392,356 | 2/1995 | Konno | 380/23 |
| 5,402,492 | 3/1995 | Goodman et al. | 380/25 |
| 5,416,840 | 5/1995 | Cane | 380/4 |
| 5,481,672 | 1/1996 | Okuno | 395/186 X |
| 5,483,658 | 1/1996 | Grube | 395/186 X |
| 5,530,753 | 6/1996 | Easter | 380/4 |
| 5,546,463 | 8/1996 | Caputo | 380/25 |

FOREIGN PATENT DOCUMENTS

| | | |
|---|---|---|
| 0 175 359 A2 | 9/1985 | European Pat. Off. . |
| 0 302 710 A3 | 8/1988 | European Pat. Off. . |
| 0 425 053 A1 | 10/1990 | European Pat. Off. . |
| WO 93/23807 | 5/1993 | European Pat. Off. . |

*Primary Examiner*—Robert W. Beausoliel, Jr.
*Assistant Examiner*—Dieu-Minh Le
*Attorney, Agent, or Firm*—Andrew J. Dillon

[57] ABSTRACT

A method and apparatus for providing system operation validation is disclosed. The method and apparatus for validation operates within a computer system comprising a central processing unit coupled to a programmable memory, and to a system device. The programmable memory may store programs and instructions executable on the CPU and a non-volatile memory is also provided for access by the CPU. The system operation validation is provided by a chip identifier located within a device memory within the system device, which memory also serves as a chip identifier register. Selected information stored within the non-volatile memory is used, along with the chip identifier, to generate a first encryption code associated with the system device. An encryption key is used to generate a second encryption code associated with the computer system. The first and second encryption codes are matched to provide a first level system operation validation. A second chip identifier is generated, which identifier is associated with the computer system. Both chip identifiers are compared to provide a second level system operation validation.

11 Claims, 3 Drawing Sheets

METHOD AND APPARATUS FOR VALIDATING SYSTEM OPERATION

BACKGROUND OF THE INVENTION

1. Technical Field

The present invention relates, generally, to a computer system having a non-volatile memory and, more specifically, to electronic security information being stored in the non-volatile memory. More specifically, the present invention relates to a computer system having a non-volatile memory with security information written into the non-volatile memory and a way of detecting when that information has been altered so as to prevent operation of the computer system once tampering has been detected.

2. Description of the Related Art

Electronic serial numbers are being employed in more and more electronic devices. These serial numbers are used for multiple purposes ranging from determining whether a device is still under warranty to providing a unique machine identification so that a software key is required to run on that specific machine serial number (this feature is provided in license managers such as NETLS). The objective of providing the electronic serial number is to allow software access to the serial number so that it can be tracked electronically or used as part of the software key encryption algorithm. There is an inherent weakness in the electronic serial number in that the manufacturer of the electronic device wants to control the machine serial number or unique data and that every machine serial number written must be unique. To provide the manufacturer the flexibility to write a different serial number on each machine, the machine is designed with some type of non-volatile memory (NVM) that the manufacturer can write (such as EPROM, PROM, ROS, EEPROM, flash type of memory or a track or header on a tape, DASD or optical diskette). Since the serial number is located in a programmable memory, it is easy for someone else to duplicate the serial number by simply copying the contents of one NVM media to another NVM media or writing a portion of the NVM media. By creating a duplicate serial number machine, all of the software programs that are licensed for the original machine can now be used on the duplicate serial number machine effectively bypassing the license manager checks.

There are multiple ways in which a unique chip identifier can be programmed in a chip and made non changeable. The easiest way is to have a tie up or down signal feed a series of fuses, which in turn feed inputs to a register. These fuses can be blown by a laser as part of the normal chip manufacture process providing a unique chip identifier. The chip fuses are typically blown at the wafer level and contain the lot number, the wafer number, and the chip location on the wafer. Obviously many bits are needed (more than 64) on high volume chips since there is a high percentage of chips that are scrapped and the unique chip identifiers are never used. Chip fuses have been used for many years in DRAM and SRAM designs to select a different portion of the array to be used if found defective by manufacturing. The ability to produce unique chip identifiers is known in the industry.

A second way a unique chip identifier can be built into a module is by using module laser delete chip I/O's. Module laser delete is done in a similar fashion as the chip laser delete in that a tie up or down signal is fed to a series of fuses which in turn go to chip I/O pins and from there to latches in a register. A laser is used to blow the fuse thus causing the data in the latch to be personalized. The register is then made available to the software. This method reduces the number of bits needed for the unique chip identifier since the chips have already been tested before mounting on the modules and most modules will test good. Again, since a fuse has been blown, it is not possible to duplicate easily another unique chip identifier.

There are several encryption techniques that can be used that can provide the manufacturer the capability to detect any duplication or modification of the non-volatile memory data such as a serial number. One example of the encryption technique is the Message Authentication Code (MAC), which uses the Data Encryption Standard encryption algorithm. The MAC routine is passed a string of text data and an encryption key and returns an 8 byte MAC. Since the DES encryption encrypts 8 bytes at a time and the result of the previous 8 byte encryption is used with the next 8 bytes of encryption, the last 8 bytes of the encryption are dependent on all of the previous text data so any change in any of the previous data will be detected in the last 8 bytes of the encryption (the MAC).

At the time the device is manufactured, the manufacturer will select an 8 byte encryption key that must be kept secret. The unique chip Identifier is included in the text portion of the data to be encrypted along with any other data the manufacturer wants to prevent being modified. A MAC is then generated and written along with the data in the non-volatile memory along with the data. The operating system software program then reads the non-volatile memory and the unique chip identifier from the hardware. If the unique chip identifier found in the text portion of the non-volatile memory does not compare with the one in the hardware, then the text has been altered (probably copied from another machine) and the software program can reject the device as being an invalid device. If the unique chip identifier in the non-volatile memory does match the one in the chip, then the software program verifies that the MAC is correct by generating a new MAC for the text of the non-volatile memory using the same key that was used to generate the MAC in manufacturing and then compares the MAC generated with the MAC in the non-volatile memory. If the MACs compare then the software program is assured that none of the text data that is covered by the MAC has been altered. Since only the manufacturer and the checking software knows the key to create the MAC AND the unique chip identifier is part of the text that created the MAC, it is not possible to alter the text or MAC unless the encryption key is known. Obviously the key must be kept secret and protected by the software and the manufacturer.

Another encryption technique that can be used is RSA where the manufacturer uses a private key to encrypt the text where the unique chip identifier is again included in the text where modification detection is required. A public key is then used by the software program to decrypt the encrypted data and a comparison is made by the software program of the unique chip identifier in the hardware with that in the encrypted text. If there is a match then the text is valid, otherwise the text has been copied from another machine or has been otherwise altered. The advantage of the RSA is that two different keys are used for encryption and decryption and if the public key is known, the private key can not be determined whereas DES uses the same key for encryption and decryption so the software program must hide the key very well. This invention does not rely on any specific encryption technique only on the fact that the manufacturer can control access to the encryption key.

Accordingly, what is needed is a computer system security arrangement using non-volatile memory where critical data is written, which is monitored for detecting whether the information has been altered so the system may not be run in its altered state.

SUMMARY OF THE INVENTION

It is therefore one object of the present invention to provide a computer system having a non-volatile memory.

It is another object of the present invention to provide electronic security information stored in the non-volatile memory.

It is yet another object of the present invention to provide a computer system having a non-volatile memory with security information written into the non-volatile memory and a way of detecting when that information has been altered so as to prevent operation of any portion of the computer system once tampering has been detected.

The foregoing objects are achieved as is now described. According to the present invention, a method and apparatus for providing system operation validation is disclosed. The method and apparatus for validation operates within a computer system comprising a central processing unit coupled to a programmable memory, and to a system device. The programmable memory may store programs and instructions executable on the CPU and a non-volatile memory is also provided for access by the CPU. The system operation validation is provided by a chip identifier located within a device memory within the system device, which memory also serves as a chip identifier register. Selected information stored within the non-volatile memory is used, along with the chip identifier, to generate a first encryption code associated with the system device. An encryption key is used to generate a second encryption code associated with the computer system. The first and second encryption codes are matched to provide a first level system operation validation. A second chip identifier is generated, which identifier is associated with the computer system. Both chip identifiers are compared to provide a second level system operation validation.

Examples of the devices associated with the computer system include field replaceable units wherein the chip identifier is a chip serial number that is uniquely identified with information stored in the non-volatile memory, such as an EPROM-type device, a DASD-type device, or microcode on a magnetic tape used in a tape drive device. The encryption codes may be message authentication codes.

An alternative method for validating system operation is also disclosed where the method generates a unique device digital signature associated with the system device. The system then generates a unique system digital signature associated with the computer system. The system then evaluates both unique digital signatures for system validation. Once the digital signatures are validated, the system grants system operation to the system device. The digital signatures for both the system device and the computer system are based upon their respective chip identifiers or their encryption codes generated on selected information stored within memories associated with each device and system, respectively, or both. In either embodiment, the validation also is able to detect whether the selected information stored within either the system device or the computer system has been altered.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
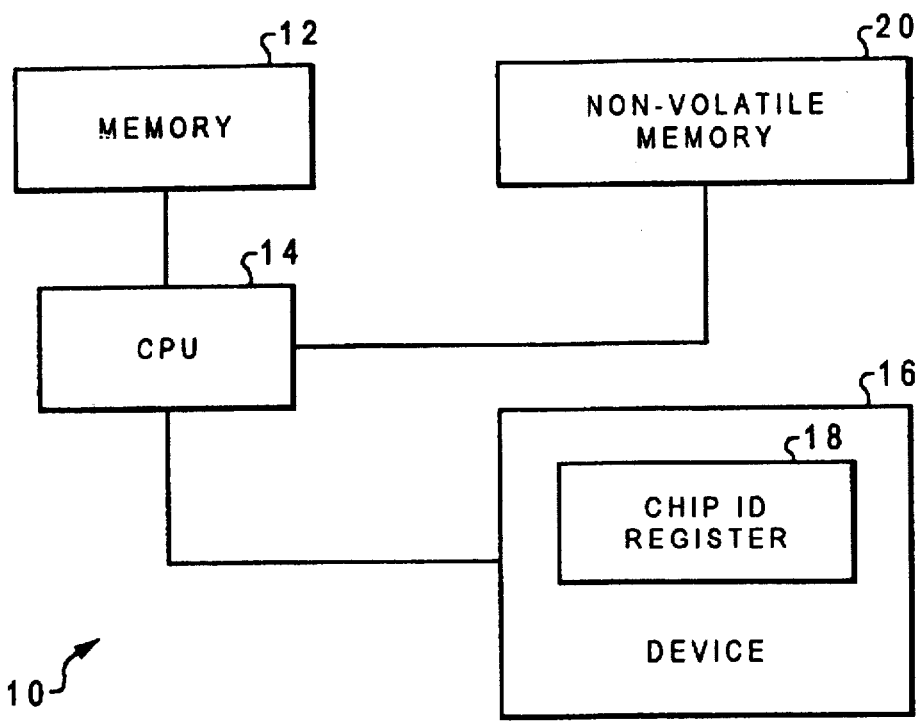
FIG. 1 is a block diagram of a computer system upon which the present invention may be implemented.

With reference now to the figures and in particular with reference to FIG. 1, depicting a block diagram of a typical configuration, such as a programmable apparatus or computer system 10, upon which the invention is used. Computer system 10 includes a memory unit 12 connected to a central processing unit (CPU) 14. The memory unit 12 contains instructions and programs that are executed in CPU 14. These instructions are used to control a device 16, which may be an electro-mechanical device such as, for example, a DASD device, with an electronic device controller, tape reader or diskette reader, or an electronic device such as, for example, a cache controller. For example, the system may be directed to a microcode-load tape to work only with a designated processor in a designated system. Device 16 further includes a chip ID register 18, which includes a unique chip identifier within the chip ID register 18. The chip identifier is read by an instruction executed in CPU 14. The unique chip identifier is built as part of the chip identifier register 18 so that each chip in a manufactured set has a different unique chip identifier.

A non-volatile memory device (NVM) 20 is further connected to CPU 14. NVM 20 contains various information that the device manufacturer uses as part of the device 16 control, such as DEVICE TYPE, DEVICE SERIAL NUMBER, and any other UNIQUE DEVICE DATA. To be able to detect any alteration in the NVM 20, a CHIP ID is included so that any software programs in memory 12 can compare the chip ID in device 16 with the chip ID written in NVM 20. Additionally, an encryption code, for example, a Message Authentication Code (MAC) is written in NVM 20 where the DEVICE TYPE, DEVICE SERIAL NUMBER, CHIP ID and UNIQUE DEVICE DATA are used as the text input to the MAC generation method. Further, an encryption key is further provided to which the software programs in memory 12 also have access.

Figure 2:
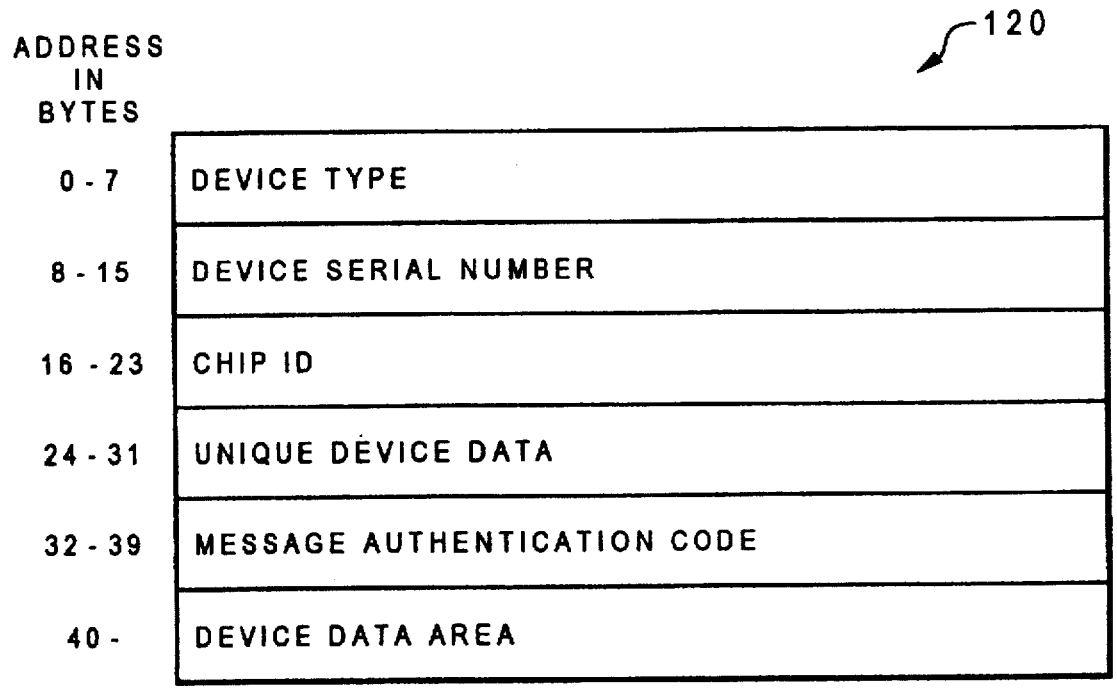
FIG. 2 depicts a block diagram of a Message Authentication Code written into the non-volatile memory of FIG. 1.
Figure 3:
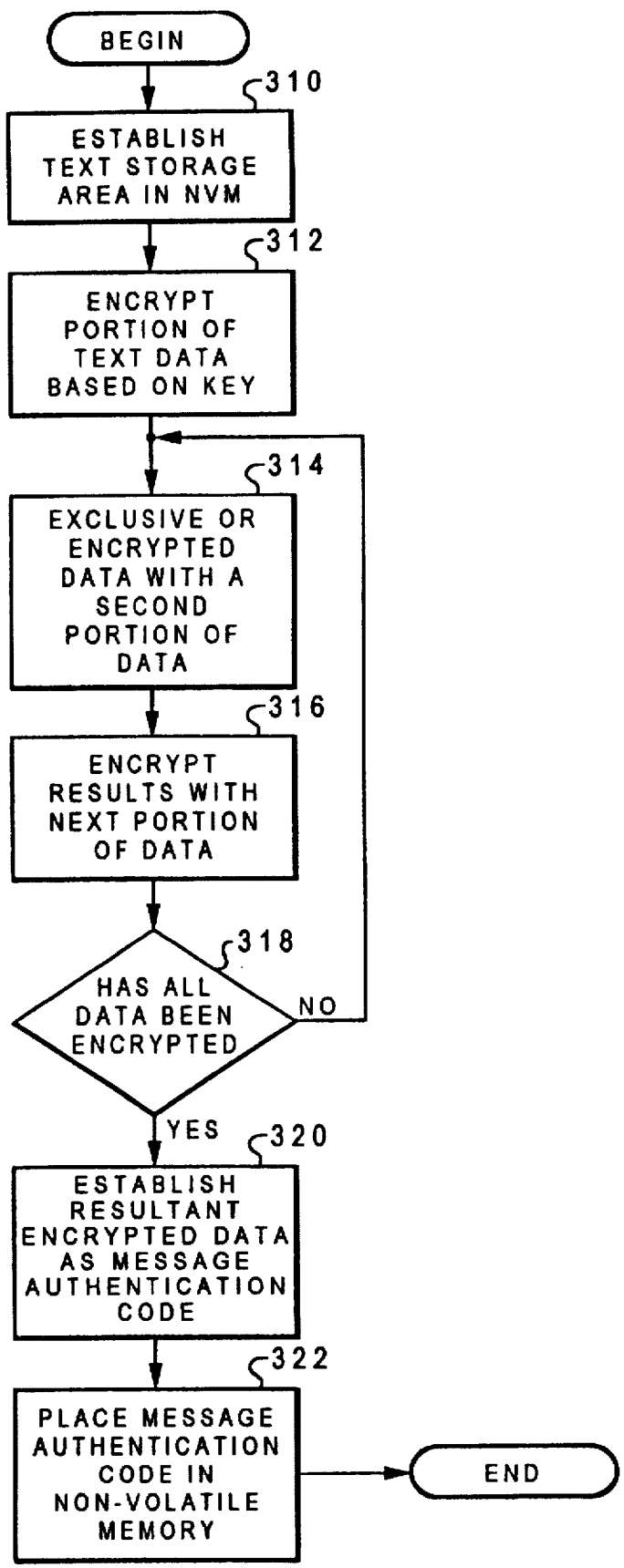
FIG. 3 is a block diagram of a flowchart representing a method of generating the Message Authentication Code of FIG. 2.

FIG. 3 is a block diagram of a flowchart depicting the method used to generate the MAC shown in FIG. 2. In step 310, a text storage area is established in NVM 20, to which the MAC is checked, consisting of 0-31 of the NVM address base. In this example, the text has a length of 32 bytes. In step 312, a 64 bit key is used to encrypt the first eight (8) bytes of the text data using a data encryption scheme (DES) method, which is well known to those skilled in the art, to yield eight (8) bytes of encrypted data. Next, in step 314, these eight (8) bytes of encrypted data are exclusively ORed with the next eight (8) bytes of the text data. The results are then encrypted in step 316, using the DES method and the same key. The results are eight (8) bytes of encrypted data that include the current eight (8) bytes of the text, plus all the previous eight (8) byte blocks of text. The system continues to encrypt the remaining text using steps 314 and 316. In step 318, the system determines whether all the text has been encrypted and if so, in step 320, a resultant eight (8) bytes is used as the MAC, which is used to detect any change in any of the text that was used as input to generate the MAC. In step 322, the MAC is placed in NVM 20 at locations 32–39, shown in FIG. 2.

The MAC is used to provide a means, or digital signature, for detecting when a serial number or any other critical data written into NVM 20 is altered. Once there is modification or duplication detected, the software program stored in memory 12 can then take steps to prevent software programs from running on the altered device 16. To provide modification detection of NVM 20, the system uses several ID items. First, a unique chip identifier that is different from any other chip, which is non-alterable, is used as a standard by which the software determines the identity of the device and whether alterations have occurred. Second, the software programs are given the ability to read this chip identifier. Third, the non-volatile memory is included to hold the text covered by the encryption algorithm. The non-volatile memory is that non-volatile memory used to store data that the manufacturer wants to prevent from being altered (such as warranty data) using an encryption technique in which the unique chip identifier is used as part of the encryption algorithm or the chip identifier.

Figure 4:
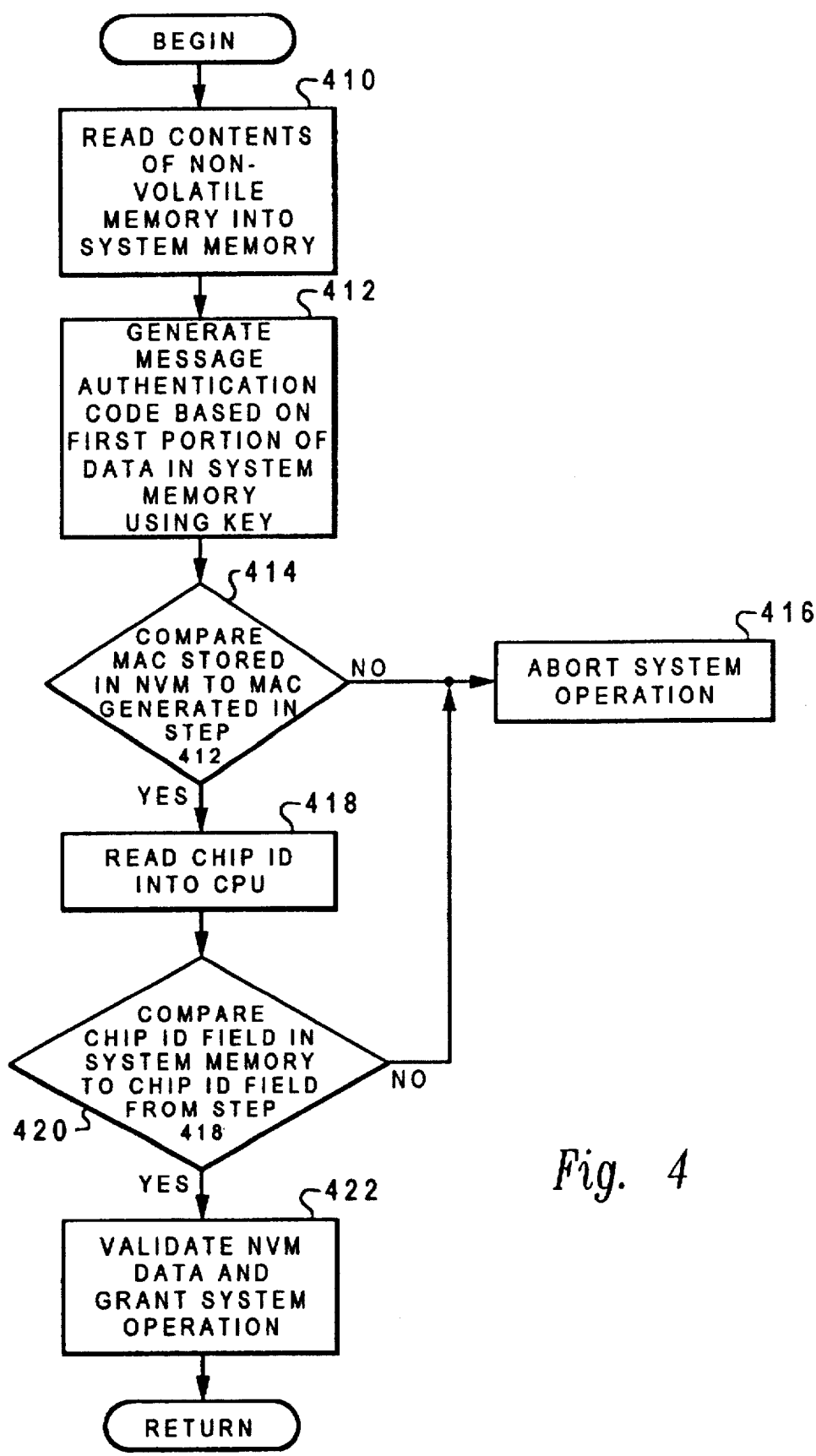
FIG. 4 depicts a block diagram of a flowchart representing the comparison of the MAC codes for detecting alteration according to the present invention.

While system 10 is operating, system code is retrieved from memory 12 into CPU 14 for execution. Prior to using device 16, the system code performs a chip identification and NVM content alteration detection test, which is illustrated in the flowchart of FIG. 4. In step 410, the system reads the contents of NVM 20 into memory 12. Next, in step 412, the system generates a Message Authentication Code of the first 32 bytes of the NVM data that was stored in memory 12, using the same key that the manufacturer used to create the MAC stored in bytes 32–39 in NVM 20. In step 414, the system compares the MAC stored in memory 12 from bytes 32–39 of the NVM 20 data with the MAC generated in step 412. If the MACs do not compare, then the NVM 20 data is not valid and the device 16 cannot be used and the system aborts in step 416. If the MACs do compare, the system, in step 418, reads the chip ID from the chip ID register 18 into CPU 14. Next, in step 420, the system compares the chip ID field from bytes 16–23 of the NVM data stored in memory 12 with the chip ID field read from chip ID register 18 read in step 418. If the fields compare, then the NVM data is valid and system operation is granted in step 422; otherwise the NVM data has been copied from another system (because the MAC was good, it had to have been copied from another system) and the device cannot be used and the system aborts in step 416.

While the invention has been particularly shown and described with reference to a preferred embodiment, it will be understood by those skilled in the art that various changes in form and detail may be made therein without departing from the spirit and scope of the invention.

I claim:

1. In a computer system comprising a central processing unit (CPU) coupled to a programmable memory, which may store programs and instructions executable on said CPU, a system device, coupled to said CPU, and a non-volatile memory, coupled to said CPU, a system operation validator comprising:

a chip identifier located in a chip identifier register within said system device;

means for utilizing selected information stored within said non-volatile memory and said chip identifier to generate a first encryption code associated with said system device;

an encryption key stored within said programmable memory;

means for generating a second encryption code associated with said CPU using said encryption key, wherein said encryption codes must match for system operation validation;

means for generating a second chip identifier associated with said CPU, wherein said chip identifiers must match for system operation validation.

2. The invention according to claim 1 wherein said system device is a field-replaceable unit and said chip identifier is a chip serial number and said non-volatile memory is a semiconductor-type device.

3. The invention according to claim 1 wherein said chip identifier is a chip serial number and said non-volatile memory is a magnetic media-type device.

4. The invention according to claim 1 wherein said chip identifier is a chip serial number and said non-volatile memory is an optical-type device.

5. The invention according to claim 1 wherein said chip identifier is a chip serial number and said non-volatile memory is a tape-drive device with said information being stored as microcode on a tape.

6. The invention according to claim 1 wherein said encryption codes are comprised of message authentication codes.

7. In a computer system comprising a central processing unit (CPU) coupled to a programmable memory, which may store programs and instructions executable on said CPU, a system device, coupled to said CPU, and a non-volatile memory, coupled to said CPU, a method for validating system operation comprising the steps of:

locating a chip identifier within in a chip identifier register within said system device;

utilizing selected information stored with said non-volatile memory and said chip identifier to generate a first encryption code associated with said system device;

generating a second encryption code associated with said CPU using an encryption key;

determining whether said encryption codes match for system operation validation;

upon matching said encryption codes, generating a second chip identifier associated with said CPU;

determining whether said chip identifiers match for system operation validation;

upon matching said chip identifiers, granting system operation.

8. The invention according to claim 7 wherein said system device is a field-replaceable unit and said chip identifier is a chip serial number and said non-volatile memory is an EPROM-type device.

9. The invention according to claim 7 wherein said chip identifier is a chip serial number and said non-volatile memory is a DASD-type device.

10. The invention according to claim 7 wherein said chip identifier is a chip serial number and said non-volatile memory is a tape-drive device with said information being stored as microcode on a tape.

11. The invention according to claim 7 wherein said encryption codes are comprised of message authentication codes.

\* \* \* \* \*